(No Model.) 6 Sheets—Sheet 2.

W. E. DOOLITTLE.
MACHINE FOR MAKING MATCHES.

No. 351,750. Patented Nov. 2, 1886.

WITNESSES: Fred G. Dieterich
Wm E. Dyre

INVENTOR
Wm E. Doolittle
BY Johnston, Reinohl & Dyre
ATTORNEYS (No Model.) 6 Sheets—Sheet 3.

W. E. DOOLITTLE.
MACHINE FOR MAKING MATCHES.

No. 351,750. Patented Nov. 2, 1886.

WITNESSES:
Fred. G. Dieterich
Wm. E. Dyne.

INVENTOR
Wm. E. Doolittle
BY
Johnston, Reinohl & Dyne
ATTORNEYS (No Model.) 6 Sheets—Sheet 4.

W. E. DOOLITTLE.
MACHINE FOR MAKING MATCHES.

No. 351,750. Patented Nov. 2, 1886.

WITNESSES:
Fred G. Dieterich
Wm. E. Dyre

INVENTOR
Wm. E. Doolittle
BY
Johnston, Reinohl & Dyre
ATTORNEYS

N. PETERS. Photo-Lithographer, Washington, D. C.

(No Model.) 6 Sheets—Sheet 6.
W. E. DOOLITTLE.
MACHINE FOR MAKING MATCHES.

No. 351,750. Patented Nov. 2, 1886.

WITNESSES:
Fred G. Dieterich
Wm E. Dyne

INVENTOR
Wm E. Doolittle
BY
Johnston, Reindel & Dyne
ATTORNEYS

UNITED STATES PATENT OFFICE.

WILLIAM EDSON DOOLITTLE, OF WEST HAVEN, CONNECTICUT.

MACHINE FOR MAKING MATCHES.

SPECIFICATION forming part of Letters Patent No. 351,750, dated November 2, 1886.

Application filed March 17, 1886. Serial No. 195,585. (No model.)

*To all whom it may concern:*

Be it known that I, WILLIAM EDSON DOOLITTLE, a citizen of the United States, residing at West Haven, in the county of New Haven and State of Connecticut, have invented certain new and useful Improvements in Machines for Making Matches; and I do hereby declare the following to be a full, clear, and exact description of the invention, such as will enable others skilled in the art to which it appertains to make and use the same.

The invention relates to certain improvements in machines for making matches, and has for its object the construction of a machine in which the splints are woven into a web and conducted through the various processes to which matches are generally subjected and carried by the web continuously and consecutively, and finally discharged from the web, their numbers registered and deposited in boxes in predetermined numbers, ready for the market. By this invention the splint is carried through the various steps involved in making matches continuously and consecutively by a web, into which the matches are woven as they pass from the hopper, and the web unwoven as they pass through the registering, cutting, and boxing machine.

The invention will be hereinafter described, and particularly pointed out in the claims.

Figure 1:
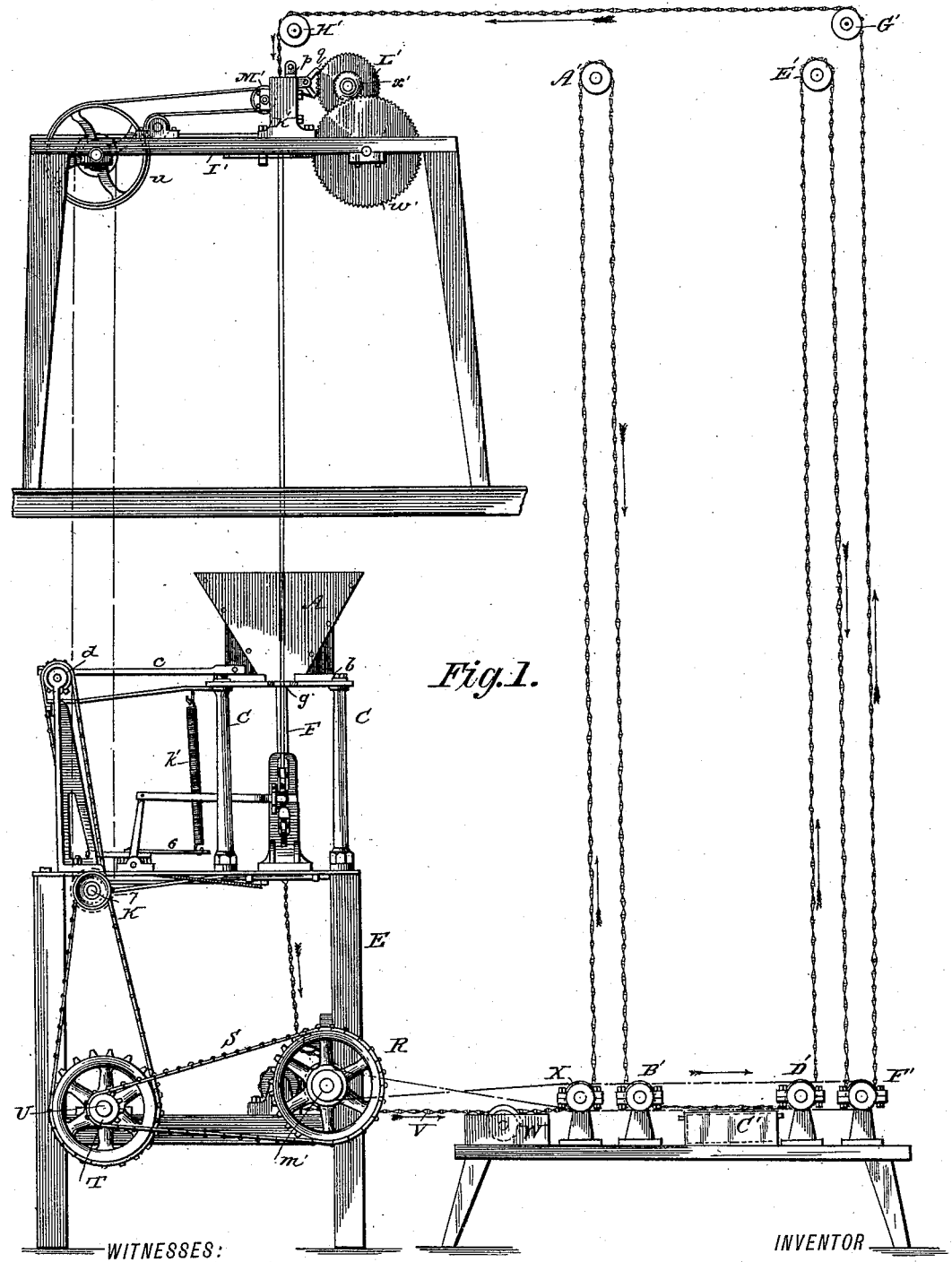
Figure 2:
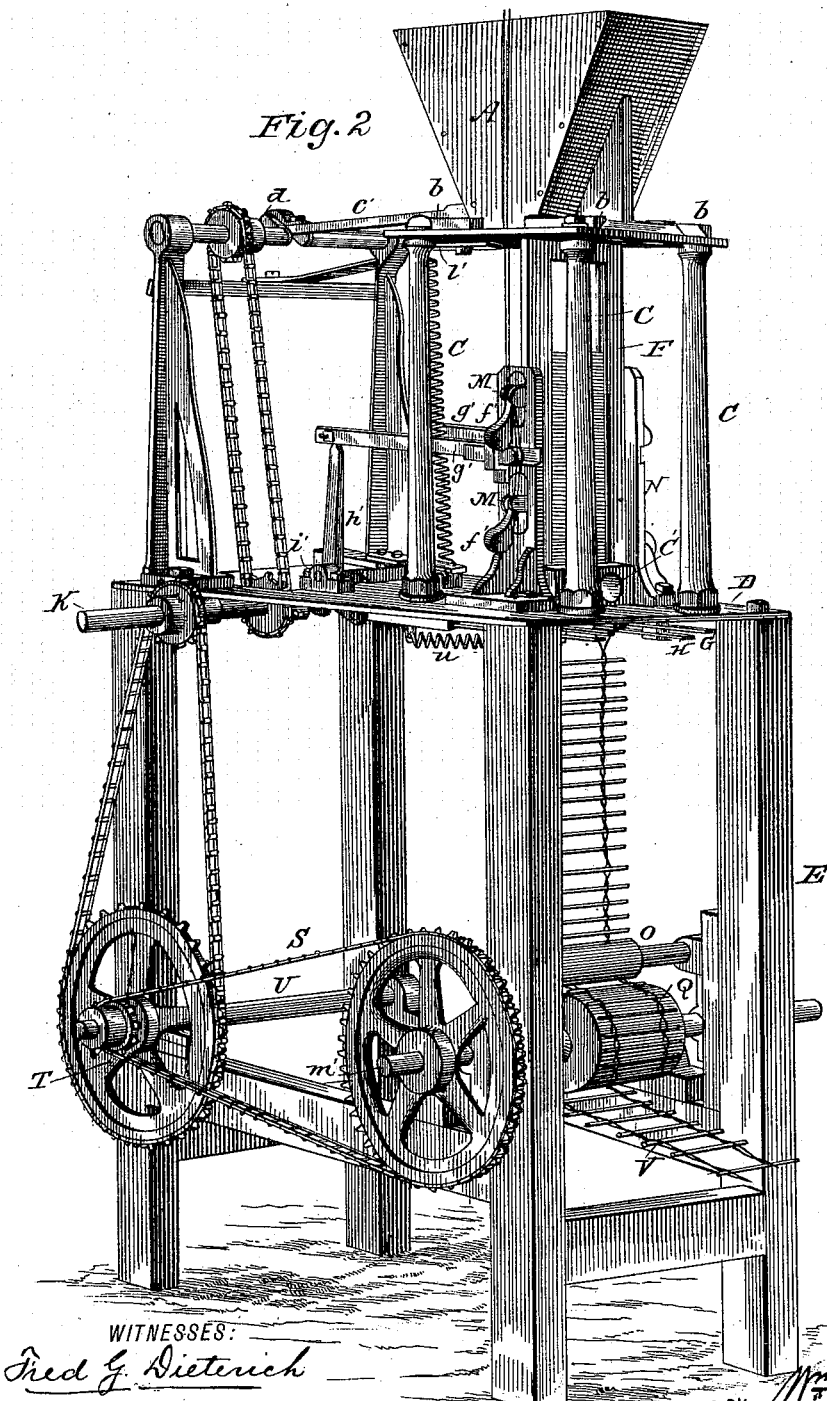
Figure 3:
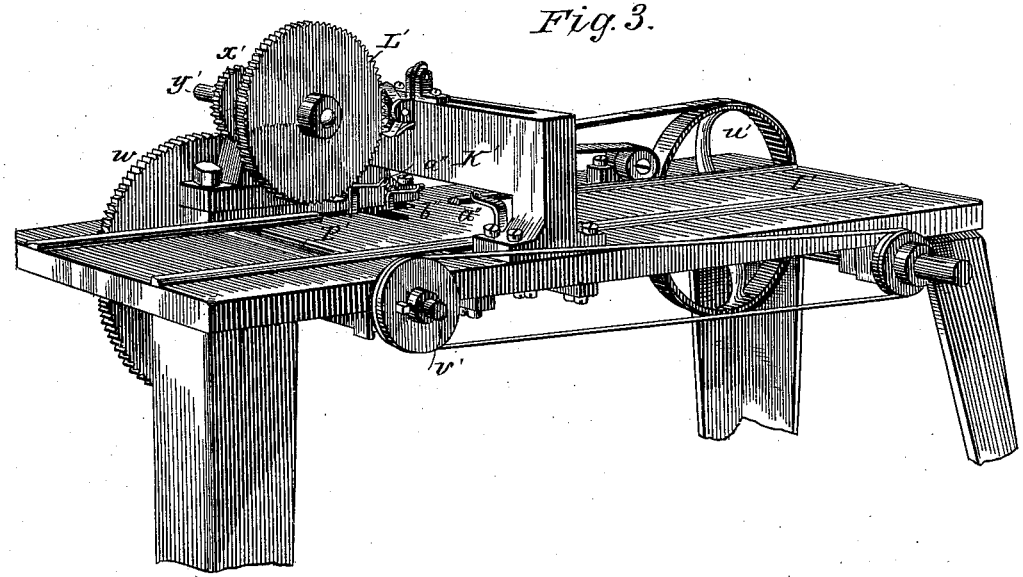
Figure 4:
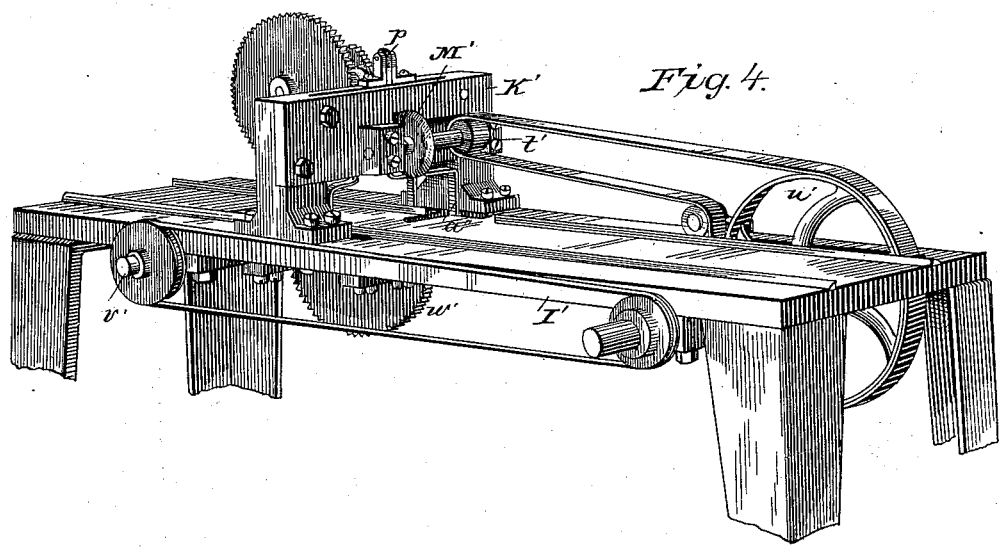
Figure 5:
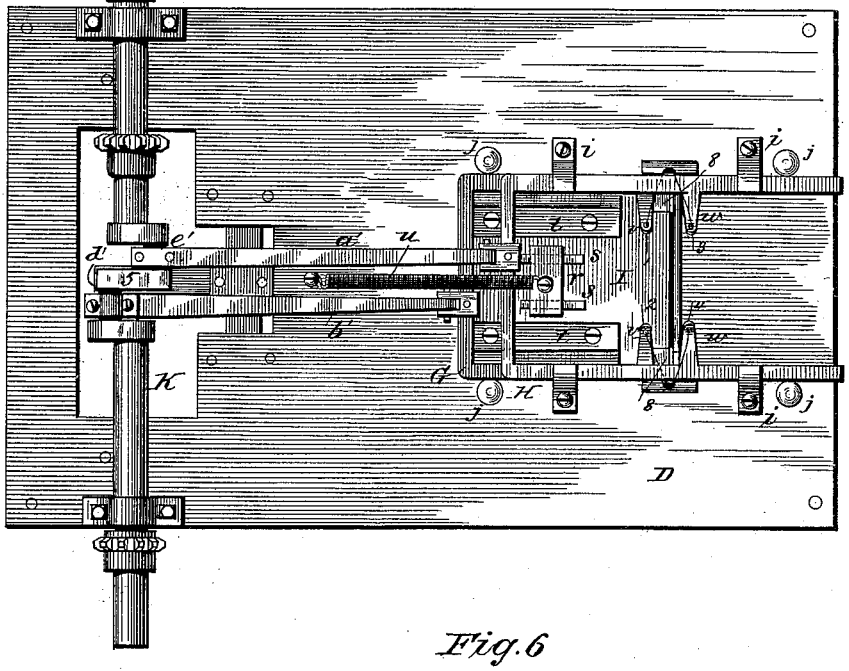
Figure 6:
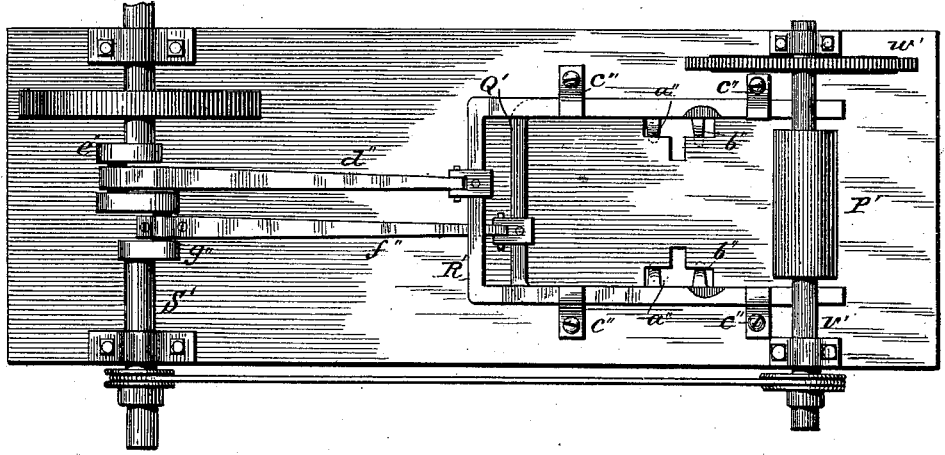
Figure 7:
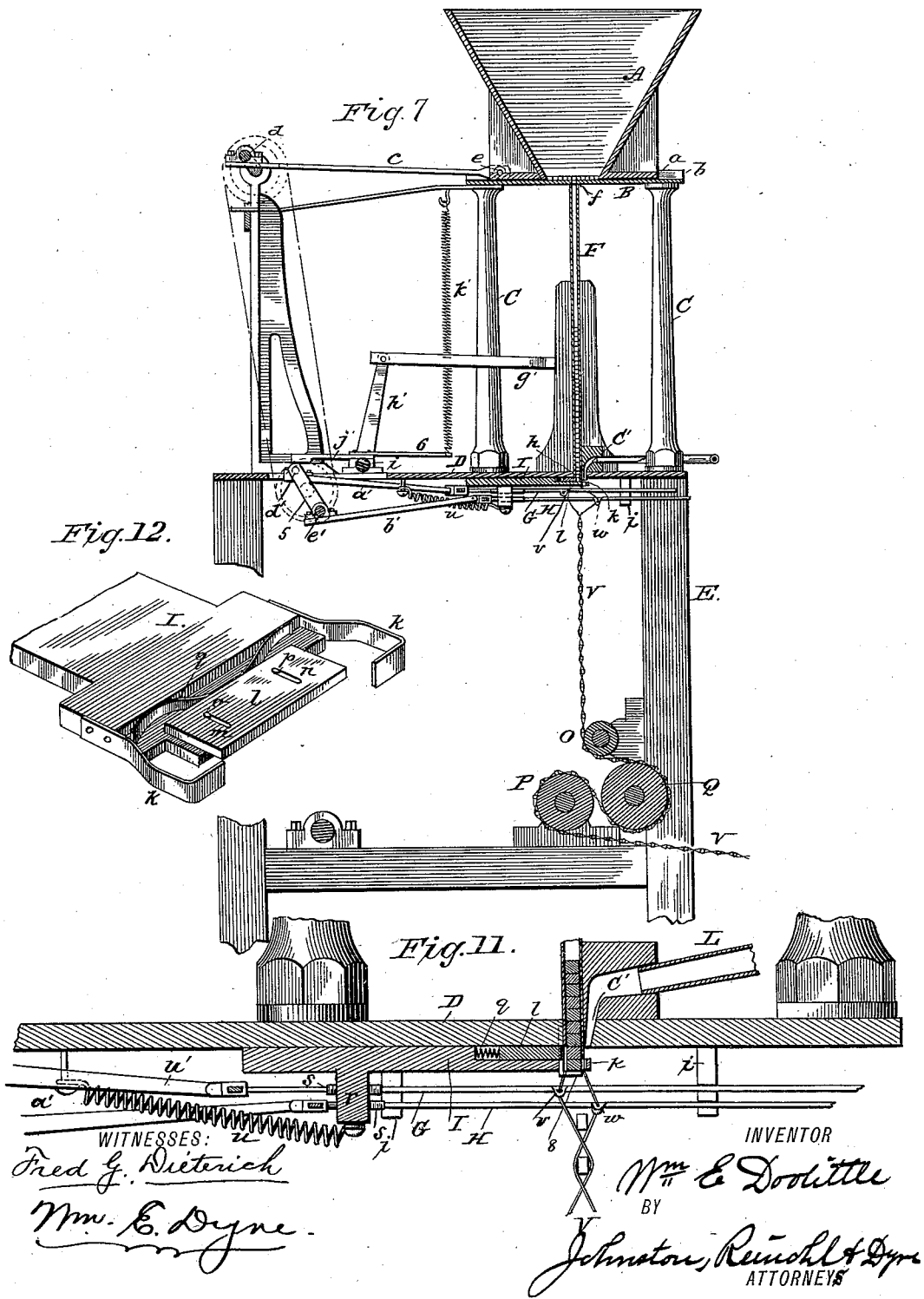
Figure 8:
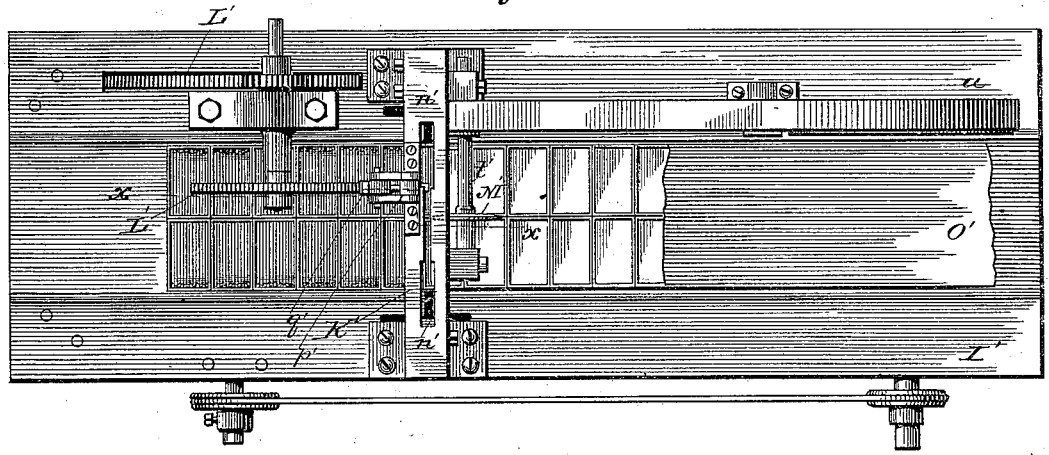
Figure 9:
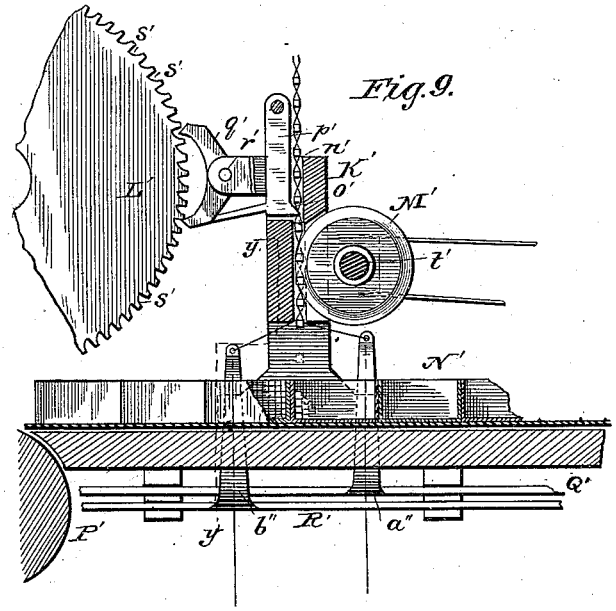
Figure 10:
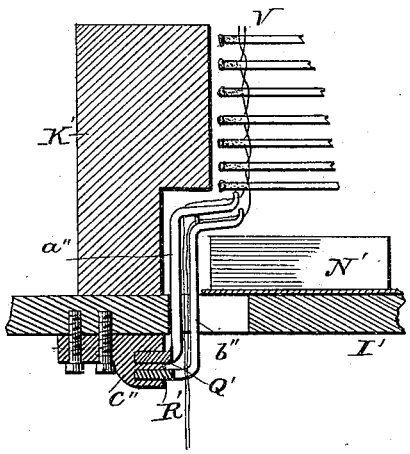

In the accompanying drawings, which form a part of this specification, Figure 1 is a side elevation showing the relative positions of the several devices employed in carrying out my invention. Fig. 2 is a perspective view of the machine for feeding and weaving the splints into the web. Fig. 3 is a perspective view of the cutting, unweaving, and registering machine. Fig. 4 is a similar view showing the cutting mechanism. Fig. 5 is an inverted plan view showing the harness for weaving the splints into the web. Fig. 6 is an inverted plan view of the harness for unweaving applied to the machine shown in Figs. 3 and 4. Fig. 7 is a longitudinal section of the feeding-machine shown in Fig. 2. Fig. 8 is a plan view of the cutting and registering machine, showing boxes in position on a belt. Figs. 9 and 10 are sections on lines $x\ x\ y\ y$, Figs. 8 and 9. Fig. 11 is a detail view on an enlarged scale, showing slide and air-blast device. Fig. 12 is a detail of the splint-feeding slide.

Reference being had to the drawings and the letters marked thereon, A represents a hopper having projections $a$ formed thereon, which engage with ways $b$, secured to a table, B, upon which the hopper rests, and is reciprocated between the ways $b$ by a pitman, $c$, secured to a crank-shaft, $d$, and to one side of the hopper A at $e$. The table B is provided with a transverse slot, $f$, through which the splints pass, and longitudinal slots $g$, for the cords which carry the splints, and is supported upon columns C, which rest upon a rectangular frame, E.

Between the table B and the plate D is a channel-way, F, through which the splints are conducted from the hopper A to the transverse slot $h$ in the plate D. Under the plate D are two frames, G H, supported by lugs $i$, and bearing directly against the under side of the plate D is a plate, I, provided with side arms, $k$, and an auxiliary sliding plate, $l$, which is supported by the plate I in a rabbet formed in the front end thereof. The plate $l$ is provided with slots $m\ n$, which engage with pins $o\ p$, and a spring, $q$, which moves said plate out and holds a splint between its outer edge and the outer wall of the channel F, as shown in the enlarged view in Fig. 11.

To support the splints after they leave the channel F, pendent arms 8 are secured to the bottom of the table D and project down within the frames G H, as shown in Figs. 5 and 11. The splints rest upon said arms 8 until they are pushed off by the forward motion of the plate I, when they are carried into position in the cords by an air-blast, as will hereinafter more fully appear.

On the under side of the plate I is secured a block, $r$, through which project adjusting studs or bolts $s$, arranged on different horizontal planes, which are struck by the sliding frames G H, and regulate the throw or extent of the movement of the plate. Said plate I is held against lateral displacement and guided in its reciprocation by side pieces, $t\ t$, which are secured to the plate D by bolts or screws, and returned to its normal position by a spring, $w$, secured to the block $r$ and to the plate D.

The frame G is provided with arms $v$ on opposite sides, and the frame H with corresponding arms, w, each having eyes formed in their ends, through which continuous cords 1 2 3 4 pass. The frames are connected to a shaft, K, by pitmen a' b', respectively, and are reciprocated thereby in such a manner as to weave the splints into the cords 1 2 3 4, and form a web on each end of the splints.

The weaving is accomplished by the well-known process of crossing the cords by the reciprocations of the harness, and each splint is held between the crossings of the cord, as shown in Fig. 11.

L represents an air-tube, which communicates with a gradually-contracted passage, c', having its discharge-orifice flush with the bottom of the plate D, and with an air-pump or storage-reservoir, from which air under about two (2) pounds pressure is conducted, and carries the splint into position between the cords, to be secured by weaving them in.

To the top of the plate D are secured brackets M N, which support weighted levers f'', the inner ends of which rest upon the cords 1 2 and 3 4, respectively, and form a gripping device to prevent the cords from being drawn up by the lever g', which is connected to an arm, h', attached to a shaft, i', to which is connected horizontal arm j'', which extends back and is struck by the crank-arm 5 of the shaft K in its revolution, as shown in Figs. 5 and 7. The forward stroke of the lever g', effected by the crank-shaft K, takes up any slack in the cords 1 2 3 4 and keeps them stretched or "taut," and the lever is returned from contact with the cords by a tension-spring, k', connected at one end to a brace, l', and at the other to an arm, 6, also attached to the shaft i'.

O P Q are graduated feeding-rollers, mounted on suitable shafts supported upon the frame E. To the shaft m' of the large roller Q is secured a drive-wheel, R, provided with teeth on its circumference, which engage with the links of a sprocket-chain, S, which engages with a small wheel, T, on the shaft U. The shafts K' and d are connected by similar sprocket-chains, and the shaft K carries a driving-pulley, 7, (shown in dotted lines,) from which all of the machinery connected with or forming a part of the apparatus is operated.

For convenience of description I will now designate the fixed splints and cords as web V, and follow it in the further operation of the machine.

W is a suitable vessel, containing brimstone or other suitable material, according to the kind of matches being made, into which the ends of the splints are dipped in any well-known manner, and are then carried under roller X, up over the roller A', down under the roller B', (by which time the coating has dried,) across the vessel C', containing phosphorus or potassium, with which the ends are coated. They are then carried under the roller D', up over E', down under roller F', up over rollers G' and H' to the cutting, registering, and boxing machine.

The cutting, registering, and boxing machine consists of a rectangular table, I', mounted upon suitable legs or supports placed directly over the machine supporting the hopper, with the parts in line, as shown in Fig. 1. Crossing the table I', at right angles thereto, is a projecting head, K', having a longitudinal slot, n', formed therein, through which the web V passes. As the web is drawn down each splint strikes an inclined projection, o', on an oscillating lever, p', which communicates motion to a double-armed pawl or escapement, q', supported at r'' on an arm projecting from the head K', and, engaging with teeth s', turns the wheel L' to the extent of one tooth. The periphery of the wheel is provided with a specified number of teeth—one, two, or more hundred, according to the size of the boxes to be filled.

Should there have been a miss in the weaving in of a splint into the web V, the web will pass on down without affecting the registering-wheel, as only splints passing the projection o' will move the lever p' and the escapement q' and turn the wheel K'.

M' is a revolving cutter-wheel, mounted upon a shaft, t', driven from a pulley, w', and cuts the splints in two directly after they have been registered.

On the under side of the table I' is arranged an unweaving device, which releases the matches from their respective webs, which holds them and allows them to fall into boxes N', supported upon and carried by a belt, O', which is propelled by a pulley, P', which projects through the table I', and is secured upon a shaft, v', which carries the master-wheel w', engaging with the pinion x', secured to the shaft y', which supports the registering-wheel L'.

The gearing described is so proportioned that by the time the wheel L' has made one revolution the pulley P' will have moved the belt O' along under the head K' just sufficiently to receive the number of matches determined upon for each box to contain. The matches are dropped into the boxes consecutively as they are unwoven from the web Y.

Under the table K' are secured two frames, Q' R', from which arms a'' b'' project up through the table. The ends of said arms are provided with eyes, through which the cords 1 2 3 4 pass, and said cords and matches are unwoven by a motion the reverse of that by which they were previously woven.

The frames are held in lugs c'', secured to the bottom of the table, and to the frame Q' is attached a pitman, d'', which is secured to the crank e'', and a pitman, f''', connects the frame R' to the crank g'' of the shaft S', by which said frames are reciprocated.

The several parts being constructed substantially as described, the operation is as follows: Power having been applied to the machine, splints of suitable dimensions and of a length to make two matches are placed in the hopper A, which being reciprocated across the table B by the shaft d, the splints are fed consecutively through slot $f$ into the channel F, by which they are conducted through the slot $h$ in the plate D, and are held one by one by the auxiliary sliding plate $l$ between its outer end and the outer wall of the channel F, to support the weight of the column of splints in said channel. The plate I, which carries the auxiliary plate $l$, is now retracted by the spring $u$, which releases the lower splint and lets it fall upon the arms 8, and instantly the spring $q$ throws the plate $l$ forward and presses the next splint against the outer wall of the channel F and holds it. While this operation is being effected the plate I has been thrown forward by one of the frames G or H striking one of the studs $s$ in the block $r$, and has pushed the splint from its bearing on the arms 8. The air-blast from the pipe L now carries the splint into position in the cords 1 2 and 3 4, when, by the reciprocation of the frames G and H and their projecting arms $v$ and $w$, which constitute the weaving-harness, the cords are crossed and the splint woven into the cords at each side of the center of the splint. The feeding-rollers O P Q now draw the web V down, and the rollers X, B', D', and F', connected to the shaft $m'$ by suitable belting, carry the web and splints woven into said web until they have passed the registering-wheel, been cut in two, and the cords constituting the web unwoven, when they are dropped into a box.

So far as I am aware I am the first person to utilize an air-blast in the manufacture of matches to carry the splints from one position to another, and while I have shown the air-blast applied to convey the splints into position in the cords for weaving them into said cords, it is obvious that such a blast may also be employed to conduct the matches from the web into the boxes. I do not therefore limit myself to the single use of an air-blast in the process of making matches.

Having thus described my invention, what I claim is—

1. The process of making matches, which consists in charging splints into a hopper, feeding them into position on cords, weaving the splints into the cords, conducting them through fulminates, drying, registering, and cutting the splints, unweaving the cords, and finally boxing the matches, substantially as described.

2. The process of making matches, which consists in charging splints into a hopper, feeding them through a channel, conducting them into position on cords by an air-blast, weaving the splints into the cords, treating them with fulminates, drying, registering, and cutting the splints, unweaving the cords, and finally boxing the matches consecutively and continuously, substantially as described.

3. In a match-making machine, a web or belt for carrying splints, in combination with a pipe supplying an air-blast for conveying said splints into position on the web or belt, substantially as described.

4. In a match-making machine, a continuous web of cords, in combination with a weaving and unweaving harness, substantially as described.

5. In a match-making machine, a continuous web of cords, in combination with a splint-feeding device, a pipe for supplying an air-blast, and a weaving and an unweaving harness, substantially as described.

6. In a match-making machine, the combination of a reciprocating hopper, a channel communicating with said hopper, a reciprocating feeding-plate, continuous cords, a weaving-harness, a cutter, and an unweaving device, substantially as described.

7. In a match-making machine, a continuous web for carrying splints, in combination with a tension device operating upon the cords to keep them taut, substantially as described.

8. In a match-making machine, a continuous web of cords, a splint-feeding device, a weaving-harness, a series of web-feeding rolls, an unweaving-harness, and a tension device operating to keep the cords stretched, substantially as described.

9. In a match-making machine, a continuous web for carrying splints, in combination with a tension device consisting of a reciprocating arm or lever and weighted gripping-levers bearing upon the cords forming the web, substantially as described.

10. In a match-making machine, a continuous web for carrying splints, in combination with a tension device consisting of a bracket supporting weighted gripping-levers, a reciprocating lever projected between said gripping-levers, and a spring for retracting the reciprocating lever, substantially as described.

11. In a match-making machine, a splint-feeding device consisting of a channel communicating with a hopper, and a reciprocating plate carrying a spring-actuated auxiliary plate, in combination with an actuating mechanism for moving the plates, substantially as described.

12. In a match-making machine, a splint-feeding device consisting of a channel communicating with a hopper, a reciprocating plate, a passage communicating with an air-supply, and a web for carrying splints, substantially as described.

13. In a match-making machine, a splint-feeding device consisting of a plate having projecting arms, an auxiliary spring-actuated plate, and adjustable studs for regulating the stroke of the plate, in combination with depending arms for supporting splints, and an actuating mechanism for moving the plates in one direction and a spring for returning them, substantially as described.

14. In combination with a match-making machine, a weaving-harness consisting of rectangular frames having perforated projecting arms on opposite sides, continuous cords passing through said arms, and pitmen connecting the frames with a revolving shaft for reciprocating the frames and crossing the cords, substantially as described.

15. In a match-making machine, a registering device consisting of a slotted head, a vibrating lever having an inclined projection on one side extending into the slot in the head, and connected to a double-armed pawl or escapement engaging a toothed wheel, in combination with a belt or web carrying splints, substantially as described.

16. In a match-making machine, a slotted head, and a cutting-wheel secured to a revolving shaft attached to the side of said head and projecting into the slot at right angles thereto, in combination with a web carrying splints, substantially as described.

17. In a match-making machine, the combination of a slotted head, a cutting-wheel secured to a revolving shaft and projecting into the slot, a web carrying splints, and an unweaving-harness, substantially as described.

18. In a match-making machine, the combination of a slotted head, a vibrating lever operating an escapement engaging with a toothed wheel mounted upon a shaft which is geared to a shaft carrying a roller projecting through a table, a belt supporting boxes, a web carrying splints, a cutting device, and an unweaving-harness, substantially as described.

In testimony whereof I affix my signature in presence of two witnesses.

WILLIAM EDSON DOOLITTLE.

Witnesses:
RUFUS S. PICKETT,
FRANKLIN H. HART.